United States Patent
Brown

(10) Patent No.: US 7,123,901 B2
(45) Date of Patent: Oct. 17, 2006

(54) RADIO COMMUNICATIONS DEVICE

(75) Inventor: David Brown, Berkshire (GB)

(73) Assignee: NEC Corporation, Tokyo (JP)

( * ) Notice: Subject to any disclaimer, the term of this patent is extended or adjusted under 35 U.S.C. 154(b) by 561 days.

(21) Appl. No.: 10/093,101

(22) Filed: Mar. 8, 2002

(65) Prior Publication Data

US 2002/0127999 A1    Sep. 12, 2002

(30) Foreign Application Priority Data

Mar. 8, 2001    (GB) .................................. 0105765.2

(51) Int. Cl.
*H04M 1/663* (2006.01)

(52) U.S. Cl. .................... 455/412.1; 455/412.2; 455/413; 455/417; 455/461; 455/463; 455/466; 455/566

(58) Field of Classification Search ............. 455/412.1, 455/412.2, 413, 417, 461, 463, 466, 566
See application file for complete search history.

(56) References Cited

U.S. PATENT DOCUMENTS

| 5,448,622 | A  | * | 9/1995 | Huttunen ................... 455/551 |
| 6,516,202 | B1 | * | 2/2003 | Hawkins et al. ......... 455/556.2 |
| 6,850,755 | B1 | * | 2/2005 | Allande et al. ............ 455/406 |
| 2001/0019951 | A1 | * | 9/2001 | Haumont et al. .......... 455/413 |
| 2002/0072347 | A1 | * | 6/2002 | Dunko et al. ............... 455/404 |

* cited by examiner

*Primary Examiner*—Duc Nguyen
*Assistant Examiner*—Matthew Genack
(74) *Attorney, Agent, or Firm*—Whitham, Curtis, Christofferson & Cook, PC

(57) ABSTRACT

A radio communications device is disclosed which can maintain, even if different voicemails are received at a plurality of communications lines, any of prompts advising receipt of the voicemails until after retrieval of the voicemail is ended. The radio communications device is capable of supporting at least two communication lines and includes an indication section for indicating that messages have been received for multiple communications lines and maintaining the indication regarding any of the messages until the message is retrieved.

11 Claims, 5 Drawing Sheets

RADIO COMMUNICATIONS DEVICE

BACKGROUND OF THE INVENTION

1. Field of the Invention

This invention relates to a radio communications device capable of supporting at least two communications lines wherein messages may be left with the network for both lines and the messages may be retrieved at a time selected by the user.

2. Description of the Related Art

Mobile phones a re be coming more commonly used for both personal and business use. Increasingly, individuals are possessing more than one mobile phone to accommodate their requirements, for example, a phone supplied for work and a phone for personal use.

Alternate line service is a feature where the SIM (Subscriber Identify Module) card has two associated mobile station integrated services digital network (MSISDN) numbers. This allows a user to direct two MSISDN numbers, i.e. two lines, into one RCD (Radio Communications Device) to avoid carrying more than one device. At any time, the user can select from which line the user wishes to call and will receive an individual bill for each line. The user may set a default line for outgoing calls which the user may change as desired.

Messages of the voicemail variety may be received by modern radio communication devices. When a voicemail is left for an ASL (Active Line State) system supporting two lines, 'line 1' and 'line 1' the network sends a message to the mobile phone informing that there is a voicemail waiting retrieval. Typically, the user is advised of the new voicemail by a prompt on the display screen indicating that a new voicemail has been received and the line for which the voicemail is left. The user can subsequently choose to retrieve the voicemail. After retrieving the voicemail, the associated prompt on the display screen of the radio communication device is removed.

If a second voicemail is received for the same line before the previous voicemail has been retrieved, the network does not send a further message to the phone and the prompt on the display screen is not updated.

However, if a second voicemail is left for a different line from the first, the network sends a further message to the mobile and the prompt is updated to indicate only the details of the second voicemail. After retrieving the second voicemail, the prompt associated with the second voicemail is typically replaced by a prompt advising the receipt of the first voicemail for the other line. In this case, the user will only be informed that he has a previously received voicemail for a different line after he has retrieved the second voicemail.

This situation could be problematic if the user has received an important voicemail for 'line 1' but soon after receipt a further voicemail was received for 'line 2'. In this case, the prompt advising receipt of the voicemail for 'line 1' would be overwritten and therefore the user would be unaware of the important voicemail for 'line 1' until he has retrieved the voicemail for 'line 2'.

SUMMARY OF THE INVENTION

It is an object of the present invention to provide a radio communications device capable of supporting at least two communications lines wherein, even if different voicemails are received at a plurality of communications lines, each of prompts advising receipt of the voicemails can be maintained until after retrieval of the voicemail is ended.

In order to attain the object described above, according to the present invention, there is provided a radio communications device capable of supporting at least two communication lines wherein messages may be left retrieved at a time selected by the user, comprising means for detecting retrieval of a message received for any one of the communications lines, and means for indicating that messages have been received for multiple ones of the communications lines and maintaining the indication regarding any of the messages until retrieval of the message is detected by the detecting means.

In the radio communications device, when a single voicemail is displayed, a display screen thereof will indicate that a voicemail has been received and will identify the associated line. If another voicemail is received for another line, then the prompt on the display screen will be updated to indicate that new voicemails have been received for the two lines.

Therefore, the user is advised that the user have new different voicemails received for the two lines. The user is able to select which voicemail to retrieve first regardless of which line he has currently set to default.

The communication lines may include a communication line for office and another communication line for home.

Each of the communication lines maybe capable of receiving voicemails, facsimiles or data calls.

In summary, with the radio communications device, even when different voice mails are received for multiple communication lines, each of the prompts advising reception of the messages can be maintained until retrieval of the message is ended. Consequently, voicemails received for any communication line can be retrieved without a miss.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

A radio communications device according to a preferred embodiment of the present invention is described in detail with reference to the accompanying drawings.

Figure 1:
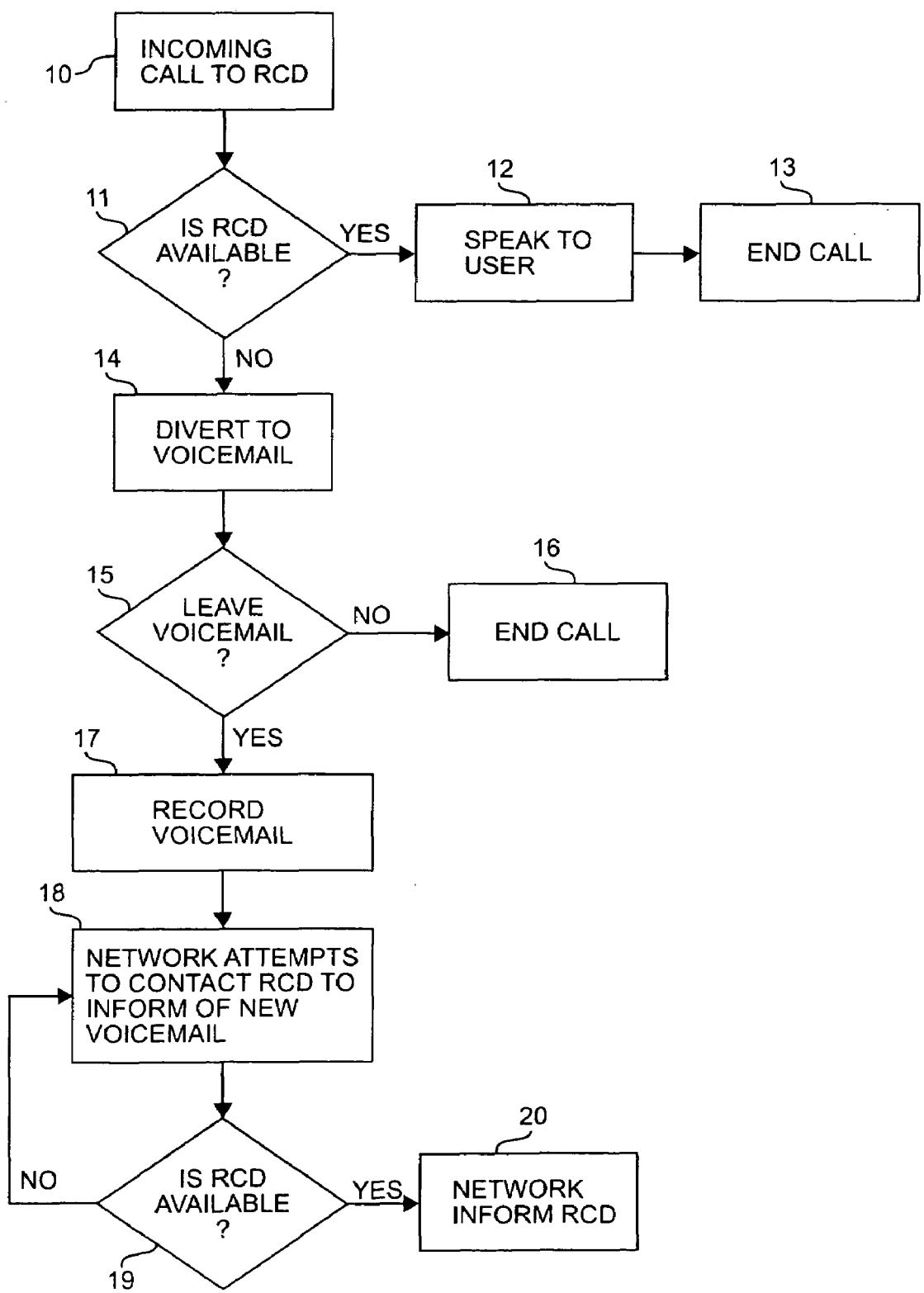
FIG. 1 is a flow chart showing the route of an incoming call.

Referring first to the flow chart of FIG. 1, a call is directed to a radio communications device (RCD) with a voicemail recording facility at step 10, and it is discriminated whether or not the radio communications device is available at step 11. If the radio communications device is available, then the processing advances to step 12, at which the caller way directly communicate with the user or the radio communications device until the call is ended at step 13. If the radio communications device is not available at step 11, the call is diverted to the voice messaging service of the network at step 14 and the caller is prompted at step 15 to leave a voicemail which may be retrieved at a later time by the user. If the voicemail is not to be left, then the call is ended at step 16. If the voicemail is to be left, then it is recorded at step 17.

After recording the voicemail at step 17, the network attempts to inform the radio communications device at step 18 that a voicemail has been received and is awaiting retrieval. If the radio communications device is available at step 19, the network sends a message to the radio communication device informing it of the new voicemail at step 20.

Figure 2:
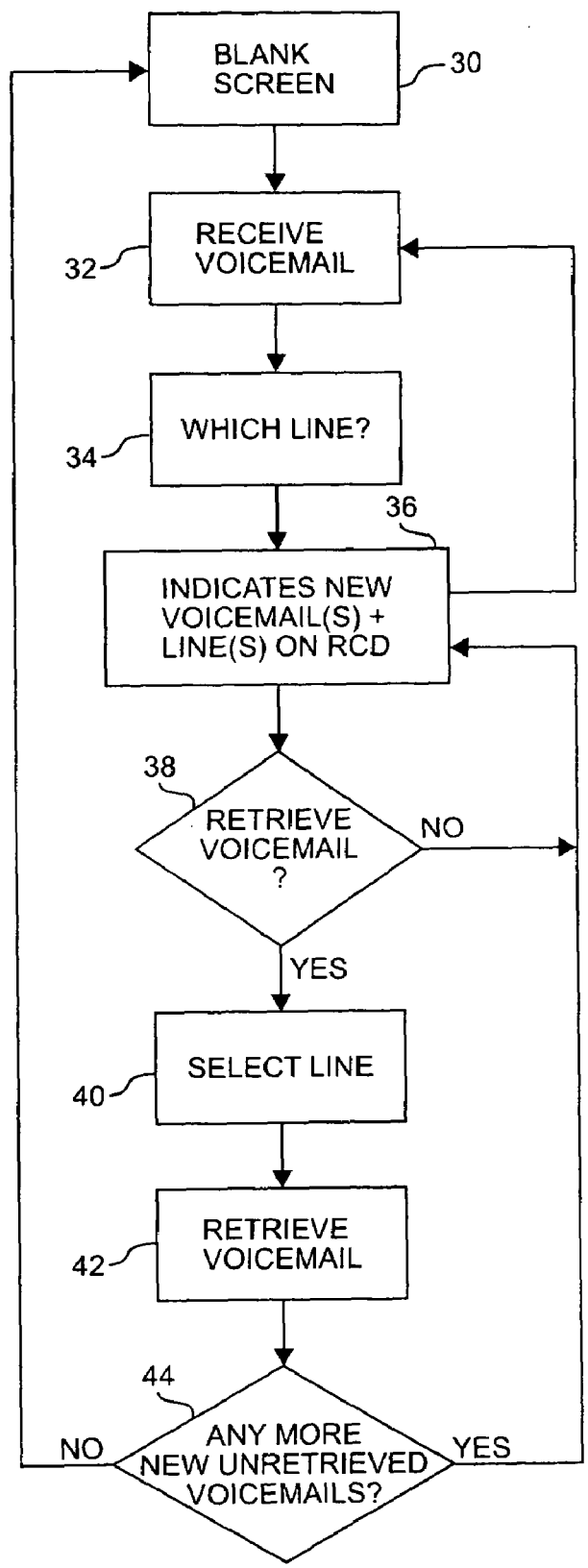
FIG. 2 is a flow chart showing different possibilities after a voicemail has been received.

The flow chart of FIG. 2 shows the procedure for indicating the receipt and retrieval of voicemails. When there are no new voicemails awaiting retrieval, the radio communications device shows the default screen (blank screen) at step 80. On receipt of a new voicemail at step 32 for a particular line 34, a visual prompt is displayed on the display screen of the radio communications device at step 36 indicating that a new voicemail is awaiting retrieval and the line for which the voicemail was received. If a further voicemail is then received at step 32 for the same line, the prompt on the display screen at step 36 is unchanged. However, if a new voicemail is received for the other line associated with the radio communications device at step 34, the prompt is updated at step 36 to indicate that new voicemails for both lines are awaiting retrieval.

The user may choose retrieve new voicemails at step 38. At step 40, the user may select the line for which the user wishes to retrieve voicemails, and the voicemails are retrieved at step 42 If any new voicemails remain for a line, the prompt associated with that line remains on the display screen at step 44. The user may subsequently retrieve any remaining voicemails in a similar manner. When all new voicemails have been retrieved, the prompt is removed and the screen of the radio communications device returns to the default setting at step 30.

Figure 3:
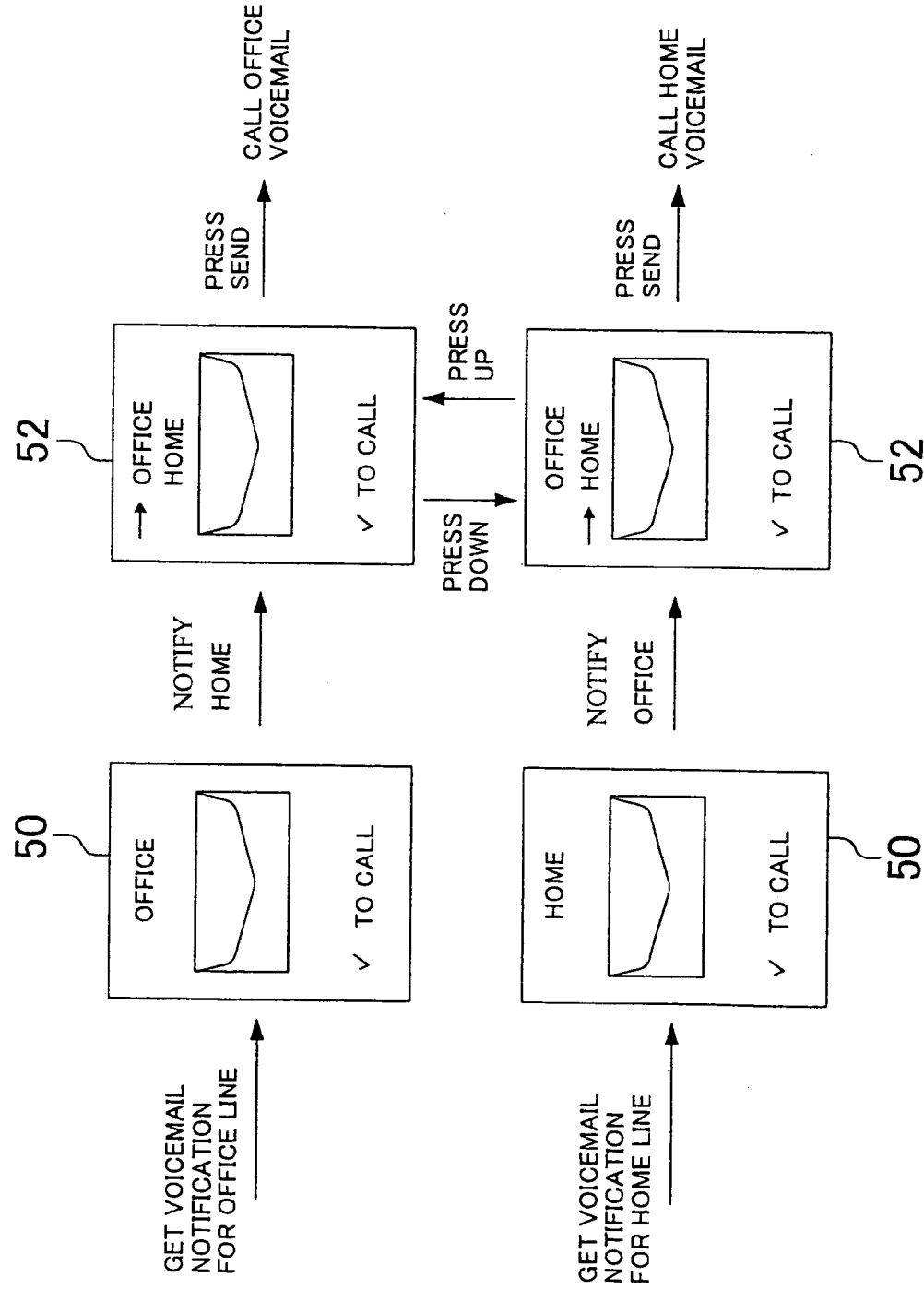
FIG. 3 is a schematic view showing typical prompts on the display screen used to indicate that new voicemails have been received.

Examples of the display screen indicating to the user that new voicemails are awaiting retrieval and transitions of the screen indication are shown in FIG. 3. In this example, the radio communications device is able to support two lines labeled "Office" and "Home". On receiving a voicemail at step 50, the screen indicates that a new voicemail is awaiting retrieval and the line for which the voicemail was left is also indicated. If a further voicemail is received for the other line, the radio communications device indicates that new voicemiails for both lines are awaiting retrieval at step 52. The user may choose to retrieve either voicemail by highlighting the selected line.

Figure 4:
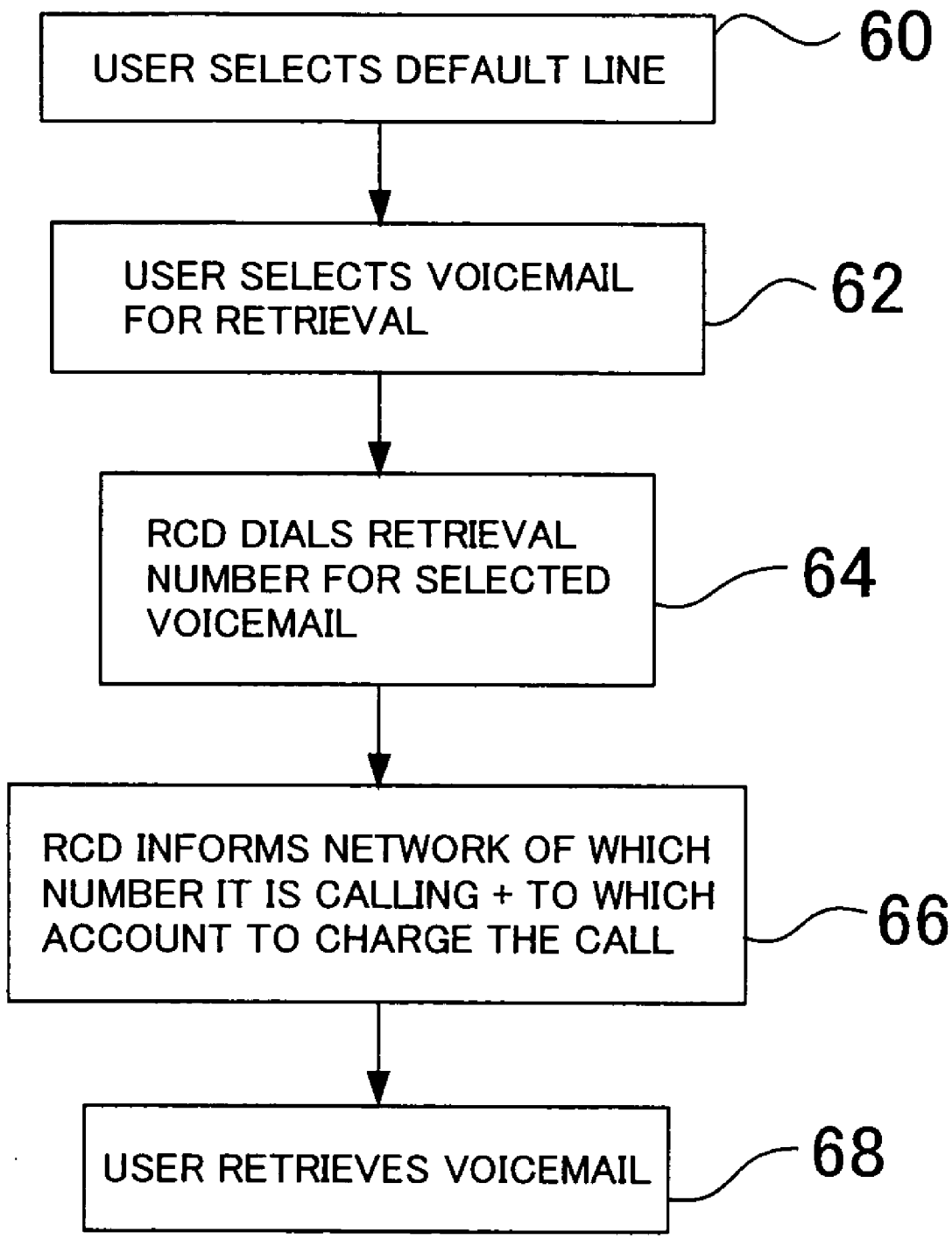
FIG. 4 is a flow chart illustrating the procedure for retrieving voicemails.

The procedure for retrieving voicemails from a radio communications device capable of supporting two lines is illustrated in the flow chart of FIG. 4. At step 60, the user may select a default line to which account all outgoing calls will be charged. At step 62, the user selects to retrieve the voicemails for a particular line and activates the voicemail retrieval procedure. At step 64, the radio communications device dials the retrieval number associated with the selected voicemail. At step 6, the radio communications device informs the network of the outgoing call and to which account the call is to be charged, overriding the default line setting. At step 68, the user retrieves the voicemail.

Figure 5:
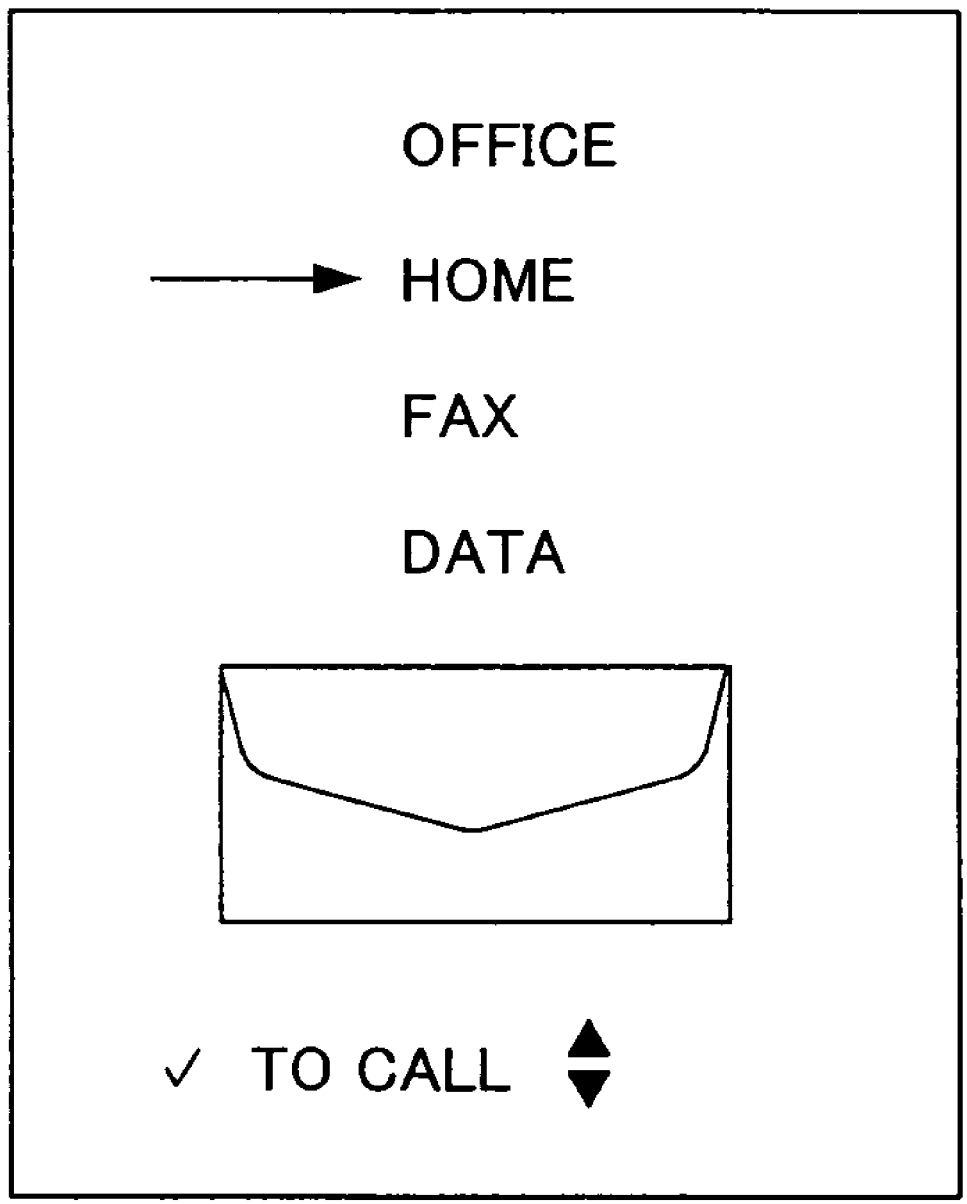
FIG. 5 is a schematic view showing a typical display screen of a radio communications device capable of receiving voicemails on four lines including a fax and data line.

Alternative embodiments of the invention include radio communication devices capable of receiving voicemails on facsimiles and data lines. An example of the display for this embodiment is shown in FIG. 5.

While a preferred embodiment of the present invention has been described using specific terms, such description is for illustrative purposes only, and it is to be understood that changes and variations may be made without departing from the spirit or scope of the following claims.

What is claimed is:

1. A method of supporting at least two communications lines in a radio communications device with a voicemail recording facility wherein, even if different voicemails are received at a plurality of communications lines, prompts advising receipt of the voicemails for each line are maintained until after retrieval of all voicemails is ended, the method comprising the steps of:

for a call is directed to the radio communications device on one of the communications lines, discriminating whether or not the radio communications device is available;

if the radio communications device is available, then providing a connection so that a caller may directly communicate with a user of the radio communications device until the call is ended, but if the radio communications device is not available, diverting the call to the voicemail recording facility and prompting the caller to record a voicemail which may be retrieved at a later time by the user;

after recording of the voicemail, informing the radio communications device that a voicemail has been received and is awaiting retrieval;

displaying by the radio communications device a visual prompt indicating that a new voicemail is awaiting retrieval and the line for which the voicemail was received;

if another voicemail is received for another line, then updating by the radio communications device the visual prompt to indicate that new voicemails have been received for the other line;

providing the user with an option to select any one of the lines for which the user wishes to retrieve voicemails; and retrieving the voicemails for a user selected line, but if any new voicemails remain for another line, maintaining the visual prompt associated with that line, whereby the user is advised that the user has new different voicemails received for the two lines and the user is able to select which voicemail to retrieve first regardless of which line the user has currently set to default.

2. The method according to claim 1, wherein the voicemail recording facility is maintained on a network and the step of retrieving the voicemails is executed by the network in response to the user selecting a line for retrieving voicemails.

3. The method according to claim 1, wherein one communication line is for office and another communication line is for home.

4. The method according to claim 1, wherein each of the communication lines may be capable of receiving voicemails, facsimiles or data calls.

5. A system including a radio communications device supporting at least two communications lines with a voicemail recording facility wherein, even if different voicemails are received at a plurality of communications lines, each of prompts advising receipt of the voicemails are maintained until after retrieval of all voicemails is ended, the system comprising:

means discriminating whether or not the radio communications device is available for a call directed to the radio communications device on one of the communications lines;

means providing a connection so that a caller may directly communicate with a user of the radio communications device until the call is ended if the radio communications device is available, but if the radio communications device is not available, diverting the call to the voicemail recording facility and prompting the caller to record a voicemail which may be retrieved at a later time by the user;

means informing the radio communications device that a voicemail has been received and is awaiting retrieval after recording of a voicemail;

a display screen on the radio communications device for displaying a visual prompt indicating that a new voicemail is awaiting retrieval and the line for which the voicemail was received;

means updating the visual prompt on the display screen of the radio communications device to indicate that new voicemails have been received for another other line if another voicemail is received for the other line;

means on the radio communications device providing the user with an option to select any one of the lines for which the user wishes to retrieve voicemails; and means retrieving the voicemails for a user selected line, but if any new volcemails remain for another line, maintaining the visual prompt associated with that line, whereby the user is advised that the user has new different voicemails received for the two lines and the user is able to select which voicemail to retrieve first regardless of which line the user has currently set to default.

6. A system as claimed in claim 5, wherein said communication lines include a communication line for office and another communication line for home.

7. A system as claimed in claim 5, wherein each of said communication lines is capable of receiving voicemail.

8. A system as claimed in claim 5, wherein each of said communication lines is capable of receiving facsimiles.

9. A system as claimed in claim 5, wherein each of said communication lines is capable of receiving data calls.

10. A system as claimed in claim 5, further including a means for informing the network of an outgoing call and to which account the call is to be charged.

11. The system according to claim 5, wherein the voicemail recording facility is maintained on a network and the means for retrieving the voicemails is part of the network responsive to the user selecting a line for retrieving voicemails.

* * * * *